US010110406B2

United States Patent
Yang et al.

(10) Patent No.: US 10,110,406 B2
(45) Date of Patent: Oct. 23, 2018

(54) SYSTEMS AND METHODS FOR CHANNEL INTERLEAVING IN WIRELESS NETWORKS

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US); Arjun Bharadwaj, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/335,220

(22) Filed: Oct. 26, 2016

(65) Prior Publication Data

US 2017/0126447 A1  May 4, 2017

Related U.S. Application Data

(60) Provisional application No. 62/334,847, filed on May 11, 2016, provisional application No. 62/266,538, (Continued)

(51) Int. Cl.

| H04L 12/00 | (2006.01) |
|---|---|
| H04L 27/26 | (2006.01) |
| H04L 1/00 | (2006.01) |
| H04L 1/04 | (2006.01) |
| H04L 27/28 | (2006.01) |
| H04L 5/00 | (2006.01) |

(Continued)

(52) U.S. Cl.
CPC ........ *H04L 27/2602* (2013.01); *H04L 1/0071* (2013.01); *H04L 1/04* (2013.01);
(Continued)

(58) Field of Classification Search
CPC ... H04L 27/2602; H04L 27/28; H04L 5/0023; H04L 1/04; H04L 1/0071
See application file for complete search history.

(56) References Cited

U.S. PATENT DOCUMENTS

| 2006/0212773 | A1 | 9/2006 | Aytur et al. |
| 2013/0179755 | A1 | 7/2013 | Yang et al. |
| 2017/0104553 | A1* | 4/2017 | Liu ........................ H04L 1/0041 |

OTHER PUBLICATIONS

ECMA., "Standard ECMA-368 High Rate Ultra Wideband PHY and MAC Standard, 3rd edition (passage)", Dec. 1, 2008 (Dec. 1, 2008), pp. 14-80, XP055338402, Retrieved from the Internet: URL : http//www.ecma-international.org/publications/files/ECMA-ST/ECMA-368.pdf.

(Continued)

*Primary Examiner* — Alvin Zhu
*Assistant Examiner* — Bo Hui A. Zhu
(74) *Attorney, Agent, or Firm* — Knobbe, Martens, Olson

(57) ABSTRACT

Methods and apparatuses for providing wireless messages can include, for example, an apparatus configured to provide wireless communication. The apparatus includes a memory that stores instructions and a processor coupled with the memory and configured to execute the instructions to select a dual sub-carrier modulation (DCM) mode or a non-DCM mode. The processor is further configured to select one or more interleaver parameters based on the selection of the DCM mode or the non-DCM mode. The processor is further configured to select a first set of interleaver parameters when the DCM mode is selected and a second set of interleaver parameters, different than the first set of interleaver parameters, when the non-DCM mode is selected. The processor is further configured to apply the one or more interleaver parameters to interleave data of a message. The processor is further configured to provide the message for transmission to a receiving device.

30 Claims, 9 Drawing Sheets

Related U.S. Application Data filed on Dec. 11, 2015, provisional application No. 62/249,100, filed on Oct. 30, 2015.

(51) Int. Cl.
*H04W 84/12* (2009.01)
*H04W 88/08* (2009.01)

(52) U.S. Cl.
CPC ............ *H04L 5/0023* (2013.01); *H04L 27/28* (2013.01); *H04W 84/12* (2013.01); *H04W 88/08* (2013.01)

(56) References Cited

OTHER PUBLICATIONS

International Search Report and Written Opinion—PCT/US2016/059134—ISA/EPO—dated Apr. 12, 2017.

Liu J., et al., "On QPSK DCM Modulation and LDPC Tone Mapper for DCM, 11-16-0056-00-00ax-on-qpsk-dcm-modulation and-ldpc-tone-mapper-for-dcm", IEEE Draft, 11-16-0056-00-00AX-ON-QPSK-DCM-MODULATION-AND-LDPC-TONE-MAPPER-FOR-DCM, IEEE-SA, Mentor, Piscataway, NJ, USA, vol. 802.11ax, Jan. 18, 2016 (Jan. 18, 2016), XP068104813, pp. 1-20.

Nguyen T-H., et al., "A Scheme of Dual Carrier Modulation with Soft-Decoding for MB-OFDM MIMO Systems", Advanced Technologies for Communications (ATC), 2011 International Conference on, IEEE, Aug. 2, 2011 (Aug. 2, 2011), XP032053855, pp. 220-223.

Partial International Search Report and Written Opinion—PCT/US2016/059134—ISA/EPO—dated Feb. 21, 2017.

Stacey R., "IEEE 802.11-15/0132r8—IEEE P802.11 Wireless LANs—Specification Framework for TGax", Sep. 22, 2015 (Sep. 22, 2015), XP055340088,pp. 1-22. Retrieved from the Internet: URL:https://mentor.ieee.org/802.11/dcn/15/11-15-0132-09-00ax-spec-framework.docx.

\* cited by examiner

| RU size (tones) | $N_{SD}$ | $N_{SD}$ for DCM | LDPC $D_{TM}$ | LDPC (with DCM) $D_{TM\_DCM}$ | BCC $N_{COL}$ | BCC (with DCM) $N_{COL\_DCM}$ | BCC $N_{ROT}$ | BCC 2ss (with DCM) $N_{ROT\_DCM}$ |
|---|---|---|---|---|---|---|---|---|
| 26 | 24 | 12 | 1 | 1 | 8 | 4 | 2 | 1 |
| 52 | 48 | 24 | 3 | 1 | 16 | 8 | 11 | 6 |
| 106 | 102 | 51 | 6 | 3 | 17 | 17 | 29 | 13 |
| 242 | 234 | 117 | 9 | 9 | 26 | 13 | 58 | 28 |
| 484 | 468 | 234 | 12 | 9 | 39 | 26 | 116 | 58 |
| 996 | 980 | 490 | 20 | 14 | 49 | 35 | | 116 |

FIG. 6

| RU size (tones) | $N_{SD}$ | $N_{SD}$ for DCM | LDPC $D_{TM}$ | LDPC (with DCM) $D_{TM\_DCM}$ | BCC $N_{COL}$ | BCC (with DCM) $N_{COL\_DCM}$ | BCC $N_{ROT}$ | BCC 2ss (with DCM) $N_{ROT\_DCM}$ |
|---|---|---|---|---|---|---|---|---|
| 26 | 24 | 12 | 1 | 1 | 8 | 4 | 2 | 1 |
| 52 | 48 | 24 | 3 | 1 | 16 | 8 | 11 | 6 |
| 106 | 102 | 50 | 6 | 2 or 5 | 17 | 25 or 10 | 29 | 13 |
| 242 | 234 | 116 | 9 | 4 | 26 | 29 | 58 | 28 |
| 484 | 468 | 234 | 12 | 9 | 39 | 26 | 116 | 58 |
| 996 | 980 | 490 | 20 | 14 | 49 | 35 | | 116 |

FIG. 7

| Usable Tones | $N_{SD}$ | $N_{SD}$ for DCM | LDPC (with (DCM) $D_{TM\_DCM}$ | BCC (with (DCM) $N_{COL\_DCM}$ | BCC 2ss (with DCM) $N_{ROT\_DCM}$ |
|---|---|---|---|---|---|
| 56 | 52 | 26 | 1 or 2 | 13 or 2 | 6 |

FIG. 8

| Usable Tones | $N_{SD}$ | | $N_{DBPS}$ | | $N_{CBPS}$ | | BCC $N_{COL}$ | | BCC $N_{ROW}$ | | LDPC $D_{TM}$ | |
|---|---|---|---|---|---|---|---|---|---|---|---|---|
| | No DCM | DCM | No DCM | DCM | No DCM | DCM | No DCM | DCM | No DCM | DCM | No DCM | DCM |
| 26 | 24 | 12 | 12 | 6 | 24 | 12 | 8 | 4 | 3 | 3 | 1 | 1 |
| 52 | 48 | 24 | 24 | 12 | 48 | 24 | 16 | 8 | 3 | 3 | 3 | 1 |
| 56 (HE-SIG-B) | 52 | 26 | 26 | 13 | 52 | 26 | 13 | 13 | 2 | 2 | - | - |
| 106 | 102 | 51 | 51 | 25 | 102 | *BCC*: *50+1* *LDPC*: *51* | 17 | 17 | 6 | 3 | 6 | 3 |
| 242 | 234 | 117 | 117 | 58 | 234 | *BCC*: *116*+1* *LDPC*: *117* | 26 | 13 | 9 | 9 | 9 | 9 |
| 484 | 468 | 234 | 234 | 117 | 468 | 234 | - | - | - | - | 12 | 9 |
| 996 | 980 | 490 | 490 | 245 | 980 | 490 | - | - | - | - | 20 | 14 |

*BCC: 1 bit post FEC padding is included per OFDM symbol for BCC encoder

FIG. 9

SYSTEMS AND METHODS FOR CHANNEL INTERLEAVING IN WIRELESS NETWORKS

PRIORITY CLAIM

This application claims the benefit of U.S. Provisional Application No. 62/249,100, filed Oct. 30, 2015; U.S. Provisional Application No. 62/266,538, filed Dec. 11, 2015; and U.S. Provisional Application No. 62/334,847, filed May 11, 2016, each of which is hereby incorporated herein by reference in its entirety.

FIELD

Certain aspects of the present disclosure generally relate to wireless communications, and more particularly, to methods and apparatuses for providing messages according to various interleaving parameters.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

One aspect of the present disclosure provides an apparatus configured to perform wireless communication. The apparatus includes a memory that stores instructions. The apparatus further includes a processor coupled with the memory and configured to execute the instructions to select a dual sub-carrier modulation (DCM) mode or a non-DCM mode. The processor is further configured to select one or more interleaver parameters based on the selection of the DCM mode or the non-DCM mode. The processor is further configured to select a first set of interleaver parameters when the DCM mode is selected and a second set of interleaver parameters, different than the first set of interleaver parameters, when the non-DCM mode is selected. The processor is further configured to apply the one or more interleaver parameters to interleave data of a message. The processor is further configured to provide the message for transmission to a receiving device.

In various embodiments, the processor can be configured to apply the first set of interleaver parameters, in a signal field of a preamble of the message, to 26 data tones for a usable tone size of 56. In various embodiments, the processor can be configured to apply the first set of interleaver parameters to at least one of 12 data tones for a resource unit (RU) size of 26, 24 data tones for an RU size of 52, 51 data tones for an RU size of 106, 117 data tones for an RU size of 242, 234 data tones for an RU size of 484, and 490 data tones for an RU size of 996. In various embodiments, the processor can be configured to apply the first set of interleaver parameters, when in a first modulation and coding scheme (MCS) mode to 50 data tones for a resource unit (RU) size of 106, and 116 data tones for an RU size of 242.

In various embodiments, the processor can be configured to apply the second set of interleaver parameters to at least one of 24 data tones for a resource unit (RU) size of 26, 48 data tones for an RU size of 52, 102 data tones for an RU size of 106, 234 data tones for an RU size of 242, 468 data tones for an RU size of 484, and 980 data tones for an RU size of 996. In various embodiments, the first set of interleaver parameters can include, for a resource unit (RU) size of 26, a low-density parity check (LDPC) tone mapping distances (DTM) of 1, for an RU size of 52, an LDPC DTM of 1, for an RU size of 106, an LDPC DTM of 3, for an RU size of 242, an LDPC DTM of 9, for an RU size of 484, an LDPC DTM of 9, and for an RU size of 996, an LDPC DTM of 14. In various embodiments, the first set of interleaver parameters can include, for a resource unit (RU) size of 26, a binary convolutional code (BCC) number of columns (Ncol) of 4, for an RU size of 52, BCC Ncol of 8, for an RU size of 106, BCC Ncol of 17, and or an RU size of 242, BCC Ncol of 13.

In various embodiments, the first set of interleaver parameters can include, for a resource unit (RU) size of 26, a binary convolutional code (BCC) number of columns (Ncol) of 4 and BCC base subcarrier rotation (Nrot) of 1 for two or more spatial streams, for an RU size of 52, BCC Ncol of 8 and BCC Nrot of 6 for two or more spatial streams, for an RU size of 106, BCC Ncol of 17 and BCC Nrot of 13 for two or more spatial streams, and for an RU size of 242, BCC Ncol of 13 and BCC Nrot of 28 for two or more spatial streams. In various embodiments, the first set of interleaver parameters can include, for a usable tone size of 56, an LDPC DTM of 1 or 2. In various embodiments, the first set of interleaver parameters can include, for a usable tone size of 56, BCC Ncol of 13 or 2.

In various embodiments, the first set of interleaver parameters can include, for a usable tone size of 56, BCC Ncol of 13 or 2 and BCC Nrot of 6 for two or more spatial streams. In various embodiments, the first set of interleaver parameters can include, for a resource unit (RU) size of 106, a low-density parity check (LDPC) tone mapping distances (DTM) of 2 or 5, and for an RU size of 242, an LDPC DTM of 4. In various embodiments, the first set of interleaver parameters can include, for a resource unit (RU) size of 106, a binary convolutional code (BCC) number of columns (Ncol) of 25 or 10 and BCC base subcarrier rotation (Nrot) of 13 for two or more spatial streams, and for an RU size of 242, BCC Ncol of 29, and BCC Nrot of 28 for two or more spatial streams.

In various embodiments, the second set of interleaver parameters can include, for a resource unit (RU) size of 26, a low-density parity check (LDPC) tone mapping distances (DTM) of 1, for an RU size of 52, an LDPC DTM of 3, for an RU size of 106, an LDPC DTM of 6, for an RU size of 242, an LDPC DTM of 9, for an RU size of 484, an LDPC DTM of 12, and for an RU size of 996, an LDPC DTM of 20. In various embodiments, the second set of interleaver parameters can include, for a resource unit (RU) size of 26, a binary convolutional code (BCC) number of columns (Ncol) of 8, for an RU size of 52, BCC Ncol of 16, for an RU size of 106, BCC Ncol of 17, and for an RU size of 242, BCC Ncol of 26. In various embodiments, the second set of interleaver parameters can include, for a resource unit (RU) size of 26, a binary convolutional code (BCC) number of columns (Ncol) of 8, and BCC base subcarrier rotation (Nrot) of 2 for two or more spatial streams, for an RU size of 52, BCC Ncol of 16, and BCC Nrot of 11 for two or more spatial streams, for an RU size of 106, BCC Ncol of 17, and BCC Nrot of 29 for two or more spatial streams, and for an RU size of 242, BCC Ncol of 26, and BCC Nrot of 58 for two or more spatial streams.

In various embodiments, the apparatus can be a mobile station, and the processing system can be configured to provide the message for transmission by being configured to transmit the message through a transmitter and an antenna of the mobile station to an access point serving the mobile station. In various embodiments, the apparatus can be an access point, and wherein the processing system can be configured to provide the message for transmission by being configured to transmit the message through a transmitter and an antenna of the access point to a mobile station served by the access point. In various embodiments, the processor can be further configured to set, when selecting DCM mode, a number of data bits in a symbol (NDBPS) to the floor of (a number of coded bits per symbol (NCBPS) times a coding rate (R)).

In various embodiments, the first set of interleaver parameters can include, for a resource unit (RU) size of 26, a binary convolutional code (BCC) number of columns (Ncol) of 4 and number of rows (Nrow) of 3, for an RU size of 52, BCC Ncol of 8 and BCC Nrow of 3, for an RU size of 56, BCC Ncol of 13 and BCC Nrow of 2, for an RU size of 106, BCC Ncol of 17 and BCC Nrow of 3, and for an RU size of 242, BCC Ncol of 13 and BCC Nrow of 9. In various embodiments, the first set of interleaver parameters can include, for a resource unit (RU) size of 26, a number of data bits in a symbol (NDBPS) of 6 and a number of coded bits per symbol (NCBPS) of 12, for an RU size of 56, NDBPS of 13 and NCBPS of 26, for an RU size of 106, NDBPS of 25 and NCBPS of 51 or 50 plus one padding bit, for an RU size of 242, NDBPS of 58 and NCBPS of 117 or 116 plus one padding bit, for an RU size of 484, NDBPS of 117 and NCBPS of 234, and for an RU size of 996, NDBPS of 245 and NCBPS of 490. In various embodiments, the second set of interleaver parameters can include, for a resource unit (RU) size of 26, a number of data bits in a symbol (NDBPS) of 12 and a number of coded bits per symbol (NCBPS) of 24, for an RU size of 24, NDBPS of 12 and NCBPS of 48, for an RU size of 56, NDBPS of 26 and NCBPS of 52, for an RU size of 106, NDBPS of 51 and NCBPS of 102, for an RU size of 242, NDBPS of 117 and NCBPS of 234, for an RU size of 484, NDBPS of 234 and NCBPS of 468, and for an RU size of 996, NDBPS of 490 and NCBPS of 980.

In various embodiments, the DCM mode can be selected exclusively in modulation and coding scheme (MSC) modes: 0, 1, 3, and 4. In various embodiments, the DCM mode can be selected exclusively for transmission over 1 or 2 spatial streams. In various embodiments, the processor can be further configured to provide an indication of a maximum constellation capability for use in the DCM mode.

In various embodiments, the processor can be further configured to provide an indication of a maximum number of streams for use in for use in the DCM mode. In various embodiments, the processor can be further configured to provide an indication of support for space-time block coding (STBC) in combination with the DCM mode. In various embodiments, the processor can be further configured to provide an indication of support for multi-user multiple-input-multiple-output (MU-MIMO) in combination with the DCM mode.

Another aspect provides a method of wireless communication. The method includes selecting a dual sub-carrier modulation (DCM) mode or a non-DCM mode. The method further includes selecting one or more interleaver parameters based on the selection of the DCM mode or the non-DCM mode by selecting a first set of interleaver parameters when the DCM mode is selected and a second set of interleaver parameters, different than the first set of interleaver parameters, when the non-DCM mode is selected. The method further includes applying the one or more interleaver parameters to interleave data of a message. The method further includes providing the message for transmission to a receiving device.

In various embodiments, the method can further include applying the first set of interleaver parameters, in a signal field of a preamble of the message, to 26 data tones for a usable tone size of 56. In various embodiments, the method can further include applying the first set of interleaver parameters to at least one of 12 data tones for a resource unit (RU) size of 26, 24 data tones for an RU size of 52, 51 data tones for an RU size of 106, 117 data tones for an RU size of 242, 234 data tones for an RU size of 484, and 490 data tones for an RU size of 996. In various embodiments, the method can further include applying the first set of interleaver parameters, when in a first modulation and coding scheme (MCS) mode to 50 data tones for a resource unit (RU) size of 106, and 116 data tones for an RU size of 242.

In various embodiments, the method can further include applying the second set of interleaver parameters to at least one of 24 data tones for a resource unit (RU) size of 26, 48 data tones for an RU size of 52, 102 data tones for an RU size of 106, 234 data tones for an RU size of 242, 468 data tones for an RU size of 484, and 980 data tones for an RU size of 996. In various embodiments, the first set of interleaver parameters can include, for a resource unit (RU) size of 26, a low-density parity check (LDPC) tone mapping distances (DTM) of 1, for an RU size of 52, an LDPC DTM of 1, for an RU size of 106, an LDPC DTM of 3, for an RU size of 242, an LDPC DTM of 9, for an RU size of 484, an LDPC DTM of 9, and for an RU size of 996, an LDPC DTM of 14. In various embodiments, the first set of interleaver parameters can include, for a resource unit (RU) size of 26, a binary convolutional code (BCC) number of columns (Ncol) of 4, for an RU size of 52, BCC Ncol of 8, for an RU size of 106, BCC Ncol of 17, and or an RU size of 242, BCC Ncol of 13.

In various embodiments, the first set of interleaver parameters can include, for a resource unit (RU) size of 26, a binary convolutional code (BCC) number of columns (Ncol) of 4 and BCC base subcarrier rotation (Nrot) of 1 for two or more spatial streams, for an RU size of 52, BCC Ncol of 8 and BCC Nrot of 6 for two or more spatial streams, for an RU size of 106, BCC Ncol of 17 and BCC Nrot of 13 for two or more spatial streams, and for an RU size of 242, BCC Ncol of 13 and BCC Nrot of 28 for two or more spatial streams. In various embodiments, the first set of interleaver parameters can include, for a usable tone size of 56, an LDPC DTM of 1 or 2. In various embodiments, the first set of interleaver parameters can include, for a usable tone size of 56, BCC Ncol of 13 or 2.

In various embodiments, the first set of interleaver parameters can include, for a usable tone size of 56, BCC Ncol of 13 or 2 and BCC Nrot of 6 for two or more spatial streams. In various embodiments, the first set of interleaver parameters can include, for a resource unit (RU) size of 106, a low-density parity check (LDPC) tone mapping distances (DTM) of 2 or 5, and for an RU size of 242, an LDPC DTM of 4. In various embodiments, the first set of interleaver parameters can include, for a resource unit (RU) size of 106, a binary convolutional code (BCC) number of columns (Ncol) of 25 or 10 and BCC base subcarrier rotation (Nrot) of 13 for two or more spatial streams, and for an RU size of 242, BCC Ncol of 29, and BCC Nrot of 28 for two or more spatial streams.

In various embodiments, the second set of interleaver parameters can include, for a resource unit (RU) size of 26, a low-density parity check (LDPC) tone mapping distances (DTM) of 1, for an RU size of 52, an LDPC DTM of 3, for an RU size of 106, an LDPC DTM of 6, for an RU size of 242, an LDPC DTM of 9, for an RU size of 484, an LDPC DTM of 12, and for an RU size of 996, an LDPC DTM of 20. In various embodiments, the second set of interleaver parameters can include, for a resource unit (RU) size of 26, a binary convolutional code (BCC) number of columns (Ncol) of 8, for an RU size of 52, BCC Ncol of 16, for an RU size of 106, BCC Ncol of 17, and for an RU size of 242, BCC Ncol of 26. In various embodiments, the second set of interleaver parameters can include, for a resource unit (RU) size of 26, a binary convolutional code (BCC) number of columns (Ncol) of 8, and BCC base subcarrier rotation (Nrot) of 2 for two or more spatial streams, for an RU size of 52, BCC Ncol of 16, and BCC Nrot of 11 for two or more spatial streams, for an RU size of 106, BCC Ncol of 17, and BCC Nrot of 29 for two or more spatial streams, and for an RU size of 242, BCC Ncol of 26, and BCC Nrot of 58 for two or more spatial streams.

In various embodiments, the method can be implemented on a mobile station, and said providing the message for transmission can include transmitting the message through a transmitter and an antenna of the mobile station to an access point serving the mobile station. In various embodiments, the method can be implemented on an access point, and said providing the message for transmission can include transmitting the message through a transmitter and an antenna of the access point to a mobile station served by the access point. In various embodiments, the method can further include setting, when selecting DCM mode, a number of data bits in a symbol (NDBPS) to the floor of (a number of coded bits per symbol (NCBPS) times a coding rate (R)).

In various embodiments, the first set of interleaver parameters can include, for a resource unit (RU) size of 26, a binary convolutional code (BCC) number of columns (Ncol) of 4 and number of rows (Nrow) of 3, for an RU size of 52, BCC Ncol of 8 and BCC Nrow of 3, for an RU size of 56, BCC Ncol of 13 and BCC Nrow of 2, for an RU size of 106, BCC Ncol of 17 and BCC Nrow of 3, and for an RU size of 242, BCC Ncol of 13 and BCC Nrow of 9. In various embodiments, the first set of interleaver parameters can include, for a resource unit (RU) size of 26, a number of data bits in a symbol (NDBPS) of 6 and a number of coded bits per symbol (NCBPS) of 12, for an RU size of 56, NDBPS of 13 and NCBPS of 26, for an RU size of 106, NDBPS of 25 and NCBPS of 51 or 50 plus one padding bit, for an RU size of 242, NDBPS of 58 and NCBPS of 117 or 116 plus one padding bit, for an RU size of 484, NDBPS of 117 and NCBPS of 234, and for an RU size of 996, NDBPS of 245 and NCBPS of 490. In various embodiments, the second set of interleaver parameters can include, for a resource unit (RU) size of 26, a number of data bits in a symbol (NDBPS) of 12 and a number of coded bits per symbol (NCBPS) of 24, for an RU size of 24, NDBPS of 12 and NCBPS of 48, for an RU size of 56, NDBPS of 26 and NCBPS of 52, for an RU size of 106, NDBPS of 51 and NCBPS of 102, for an RU size of 242, NDBPS of 117 and NCBPS of 234, for an RU size of 484, NDBPS of 234 and NCBPS of 468, and for an RU size of 996, NDBPS of 490 and NCBPS of 980.

In various embodiments, the DCM mode can be selected exclusively in modulation and coding scheme (MSC) modes: 0, 1, 3, and 4. In various embodiments, the DCM mode can be selected exclusively for transmission over 1 or 2 spatial streams. In various embodiments, the method can further include providing an indication of a maximum constellation capability for use in the DCM mode.

In various embodiments, the method can further include providing an indication of a maximum number of streams for use in for use in the DCM mode. In various embodiments, the method can further include providing an indication of support for space-time block coding (STBC) in combination with the DCM mode. In various embodiments, the method can further include providing an indication of support for multi-user multiple-input-multiple-output (MU-MIMO) in combination with the DCM mode.

Another aspect provides an apparatus for wireless communication. The apparatus includes means for selecting a dual sub-carrier modulation (DCM) mode or a non-DCM mode. The apparatus further includes means for selecting one or more interleaver parameters based on the selection of the DCM mode or the non-DCM mode, by selecting a first set of interleaver parameters when the DCM mode is selected and a second set of interleaver parameters, different than the first set of interleaver parameters, when the non-DCM mode is selected. The apparatus further includes means for applying the one or more interleaver parameters to interleave data of a message. The apparatus further includes means for providing the message for transmission to a receiving device.

In various embodiments, the apparatus can further include means for applying the first set of interleaver parameters, in a signal field of a preamble of the message, to 26 data tones for a usable tone size of 56. In various embodiments, the apparatus can further include means for applying the first set of interleaver parameters to at least one of 12 data tones for a resource unit (RU) size of 26, 24 data tones for an RU size of 52, 51 data tones for an RU size of 106, 117 data tones for an RU size of 242, 234 data tones for an RU size of 484, and 490 data tones for an RU size of 996. In various embodiments, the apparatus can further include means for applying the first set of interleaver parameters, when in a first modulation and coding scheme (MCS) mode to 50 data tones for a resource unit (RU) size of 106, and 116 data tones for an RU size of 242.

In various embodiments, the apparatus can further include means for applying the second set of interleaver parameters to at least one of 24 data tones for a resource unit (RU) size of 26, 48 data tones for an RU size of 52, 102 data tones for an RU size of 106, 234 data tones for an RU size of 242, 468 data tones for an RU size of 484, and 980 data tones for an RU size of 996. In various embodiments, the first set of interleaver parameters can include, for a resource unit (RU) size of 26, a low-density parity check (LDPC) tone mapping distances (DTM) of 1, for an RU size of 52, an LDPC DTM of 1, for an RU size of 106, an LDPC DTM of 3, for an RU size of 242, an LDPC DTM of 9, for an RU size of 484, an LDPC DTM of 9, and for an RU size of 996, an LDPC DTM of 14. In various embodiments, the first set of interleaver parameters can include, for a resource unit (RU) size of 26, a binary convolutional code (BCC) number of columns (Ncol) of 4, for an RU size of 52, BCC Ncol of 8, for an RU size of 106, BCC Ncol of 17, and or an RU size of 242, BCC Ncol of 13.

In various embodiments, the first set of interleaver parameters can include, for a resource unit (RU) size of 26, a binary convolutional code (BCC) number of columns (Ncol) of 4 and BCC base subcarrier rotation (Nrot) of 1 for two or more spatial streams, for an RU size of 52, BCC Ncol of 8 and BCC Nrot of 6 for two or more spatial streams, for an RU size of 106, BCC Ncol of 17 and BCC Nrot of 13 for two or more spatial streams, and for an RU size of 242, BCC Ncol of 13 and BCC Nrot of 28 for two or more spatial streams. In various embodiments, the first set of interleaver parameters can include, for a usable tone size of 56, an LDPC DTM of 1 or 2. In various embodiments, the first set of interleaver parameters can include, for a usable tone size of 56, BCC Ncol of 13 or 2.

In various embodiments, the first set of interleaver parameters can include, for a usable tone size of 56, BCC Ncol of 13 or 2 and BCC Nrot of 6 for two or more spatial streams. In various embodiments, the first set of interleaver parameters can include, for a resource unit (RU) size of 106, a low-density parity check (LDPC) tone mapping distances (DTM) of 2 or 5, and for an RU size of 242, an LDPC DTM of 4. In various embodiments, the first set of interleaver parameters can include, for a resource unit (RU) size of 106, a binary convolutional code (BCC) number of columns (Ncol) of 25 or 10 and BCC base subcarrier rotation (Nrot) of 13 for two or more spatial streams, and for an RU size of 242, BCC Ncol of 29, and BCC Nrot of 28 for two or more spatial streams.

In various embodiments, the second set of interleaver parameters can include, for a resource unit (RU) size of 26, a low-density parity check (LDPC) tone mapping distances (DTM) of 1, for an RU size of 52, an LDPC DTM of 3, for an RU size of 106, an LDPC DTM of 6, for an RU size of 242, an LDPC DTM of 9, for an RU size of 484, an LDPC DTM of 12, and for an RU size of 996, an LDPC DTM of 20. In various embodiments, the second set of interleaver parameters can include, for a resource unit (RU) size of 26, a binary convolutional code (BCC) number of columns (Ncol) of 8, for an RU size of 52, BCC Ncol of 16, for an RU size of 106, BCC Ncol of 17, and for an RU size of 242, BCC Ncol of 26. In various embodiments, the second set of interleaver parameters can include, for a resource unit (RU) size of 26, a binary convolutional code (BCC) number of columns (Ncol) of 8, and BCC base subcarrier rotation (Nrot) of 2 for two or more spatial streams, for an RU size of 52, BCC Ncol of 16, and BCC Nrot of 11 for two or more spatial streams, for an RU size of 106, BCC Ncol of 17, and BCC Nrot of 29 for two or more spatial streams, and for an RU size of 242, BCC Ncol of 26, and BCC Nrot of 58 for two or more spatial streams.

In various embodiments, the apparatus can be a mobile station, and said means for providing the message for transmission can include means for transmitting the message through a transmitter and an antenna of the mobile station to an access point serving the mobile station. In various embodiments, the apparatus can be an access point, and said means for providing the message for transmission can include means for transmitting the message through a transmitter and an antenna of the access point to a mobile station served by the access point. In various embodiments, the apparatus can further include means for setting, when selecting DCM mode, a number of data bits in a symbol (NDBPS) to the floor of (a number of coded bits per symbol (NCBPS) times a coding rate (R)).

In various embodiments, the first set of interleaver parameters can include, for a resource unit (RU) size of 26, a binary convolutional code (BCC) number of columns (Ncol) of 4 and number of rows (Nrow) of 3, for an RU size of 52, BCC Ncol of 8 and BCC Nrow of 3, for an RU size of 56, BCC Ncol of 13 and BCC Nrow of 2, for an RU size of 106, BCC Ncol of 17 and BCC Nrow of 3, and for an RU size of 242, BCC Ncol of 13 and BCC Nrow of 9. In various embodiments, the first set of interleaver parameters can include, for a resource unit (RU) size of 26, a number of data bits in a symbol (NDBPS) of 6 and a number of coded bits per symbol (NCBPS) of 12, for an RU size of 56, NDBPS of 13 and NCBPS of 26, for an RU size of 106, NDBPS of 25 and NCBPS of 51 or 50 plus one padding bit, for an RU size of 242, NDBPS of 58 and NCBPS of 117 or 116 plus one padding bit, for an RU size of 484, NDBPS of 117 and NCBPS of 234, and for an RU size of 996, NDBPS of 245 and NCBPS of 490. In various embodiments, the second set of interleaver parameters can include, for a resource unit (RU) size of 26, a number of data bits in a symbol (NDBPS) of 12 and a number of coded bits per symbol (NCBPS) of 24, for an RU size of 24, NDBPS of 12 and NCBPS of 48, for an RU size of 56, NDBPS of 26 and NCBPS of 52, for an RU size of 106, NDBPS of 51 and NCBPS of 102, for an RU size of 242, NDBPS of 117 and NCBPS of 234, for an RU size of 484, NDBPS of 234 and NCBPS of 468, and for an RU size of 996, NDBPS of 490 and NCBPS of 980.

In various embodiments, the DCM mode can be selected exclusively in modulation and coding scheme (MSC) modes: 0, 1, 3, and 4. In various embodiments, the DCM mode can be selected exclusively for transmission over 1 or 2 spatial streams. In various embodiments, the apparatus can further include means for providing an indication of a maximum constellation capability for use in the DCM mode.

In various embodiments, the apparatus can further include means for providing an indication of a maximum number of streams for use in for use in the DCM mode. In various embodiments, the apparatus can further include means for providing an indication of support for space-time block coding (STBC) in combination with the DCM mode. In various embodiments, the apparatus can further include means for providing an indication of support for multi-user multiple-input-multiple-output (MU-MIMO) in combination with the DCM mode.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 is an illustration of binary convolutional code (BCC) interleaving and low-density parity check (LDPC) tone mapping distances ($D_{TMs}$) for a plurality of resource unit (RU) sizes and corresponding numbers of data tones (Nsd), according to one embodiment.

FIG. 7 is an illustration of binary convolutional code (BCC) interleaving and low-density parity check (LDPC) tone mapping distances ($D_{TMs}$) for a plurality of resource unit (RU) sizes and corresponding numbers of data tones (Nsd), according to another embodiment.

FIG. 8 is an illustration of binary convolutional code (BCC) interleaving and low-density parity check (LDPC) tone mapping distances ($D_{TMs}$), according to another embodiment.

FIG. 9 is an illustration of binary convolutional code (BCC) interleaving and low-density parity check (LDPC) tone mapping distances ($D_{TMs}$) for a plurality of resource unit (RU) sizes and corresponding numbers of data tones (Nsd), according to another embodiment.

DETAILED DESCRIPTION

Figure 1:
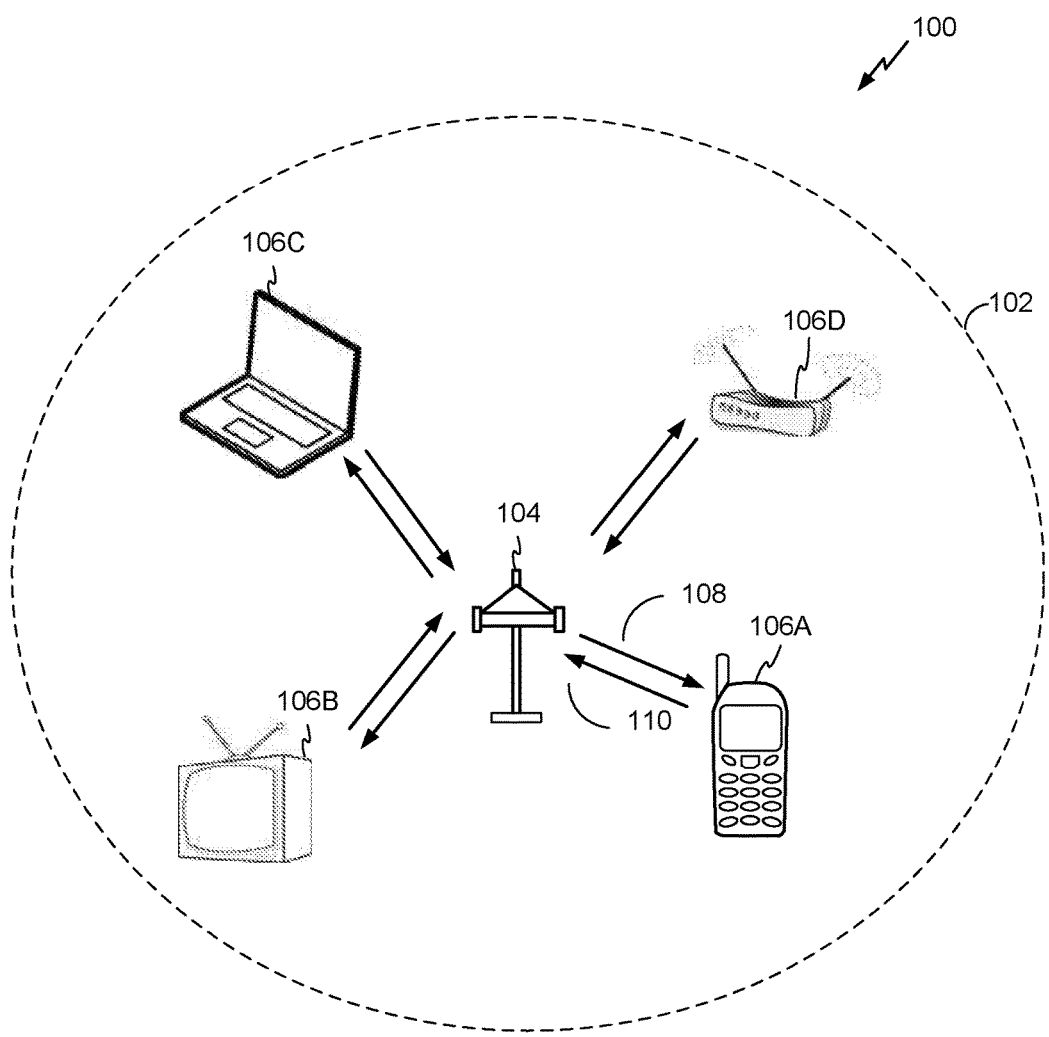
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the Institute of Electrical and Electronics Engineers (IEEE) 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement global system for mobile communications (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106A-106D.

A variety of processes and methods can be used for transmissions in the wireless communication system 100 between the AP 104 and the STAs 106A-106D. For example, signals can be transmitted and received between the AP 104 and the STAs 106A-106D in accordance with OFDM/OFDMA techniques. If this is the case, the wireless communication system 100 can be referred to as an OFDM/OFDMA system. Alternatively, signals can be transmitted and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink (DL) 108, and a communication link that facilitates transmission from one or more of the STAs 106A-106D to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106A-106D associated with the AP 104 and that use the AP 104 for communication can be referred to as a basic service set (BSS). It should be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

Figure 2:
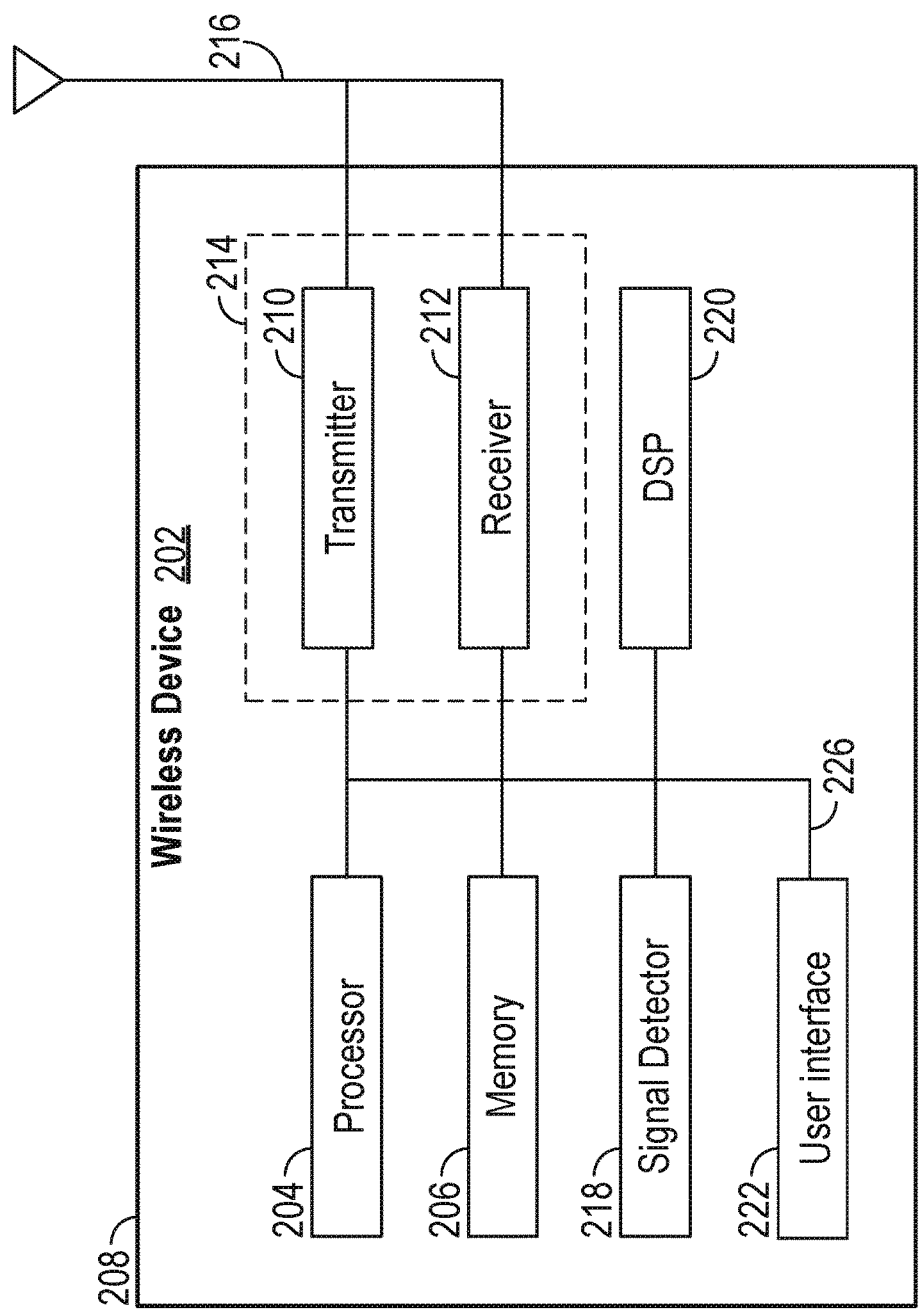
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106A-106D.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals.

The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106A-106D transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 4 ms and a 4× symbol duration can be 16 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Figure 3:
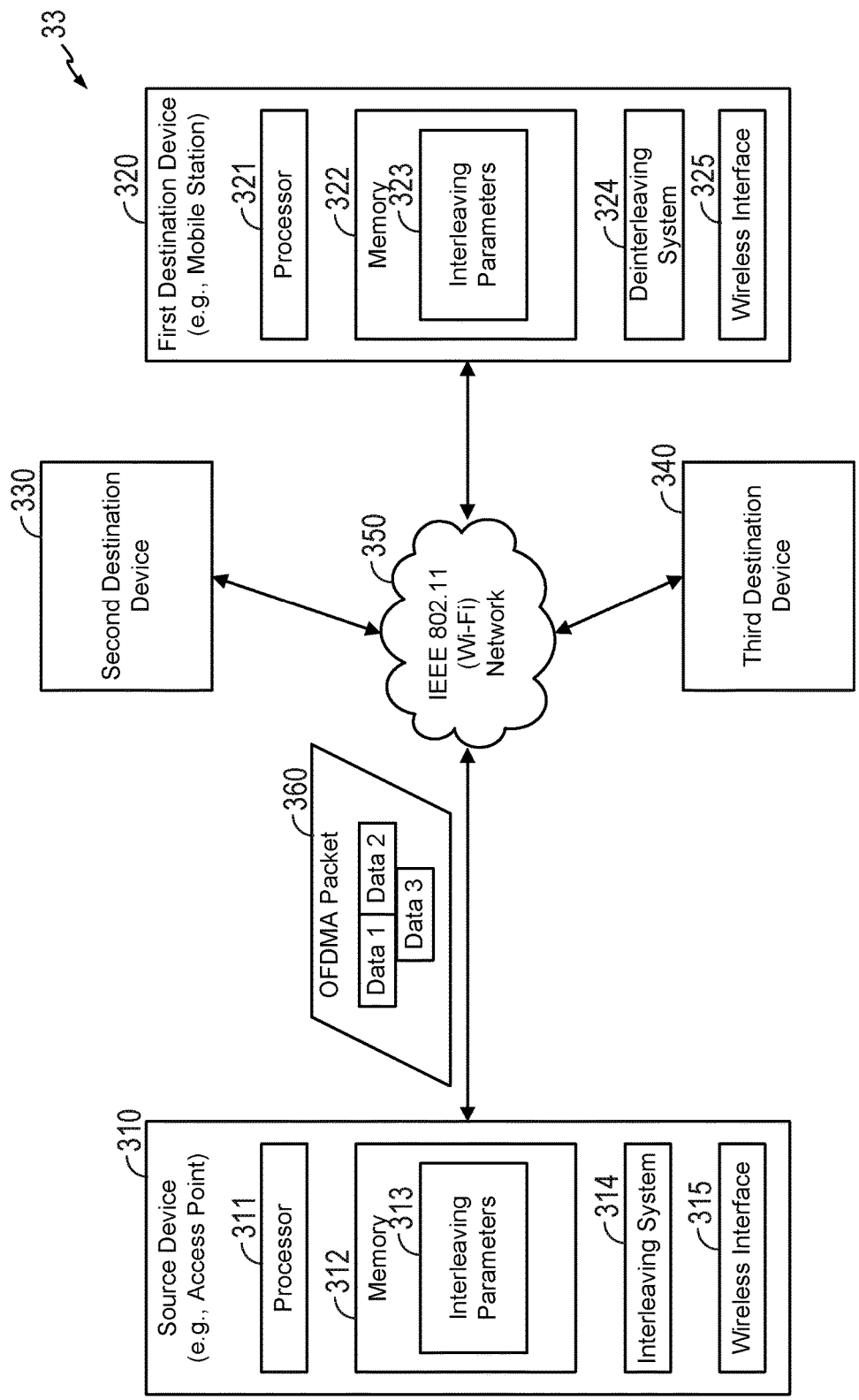
FIG. 3 shows a system that is operable to generate interleaving parameters for orthogonal frequency-division multiple access (OFDMA) tone plans, according to an embodiment.

FIG. 3 shows a system 300 that is operable to generate interleaving parameters for orthogonal frequency-division multiple access (OFDMA) tone plans, according to an embodiment. The system 300 includes a first device (e.g., a source device) 310 configured to wirelessly communicate with a plurality of other devices (e.g., destination devices) 320, 330, and 340 via a wireless network 350. In alternate embodiments, a different number of source devices destination devices can be present in the system 300. In various embodiments, the source device 310 can include the AP 104 (FIG. 1) and the other devices 320, 330, and 340 can include STAs 106A-106D (FIG. 1). The system 300 can include the system 100 (FIG. 1). In various embodiments, any of the devices 310, 320, 330, and 340 can include the wireless device 202 (FIG. 2).

In a particular embodiment, the wireless network 350 is an IEEE 802.11 wireless network (e.g., a Wi-Fi network). For example, the wireless network 350 can operate in accordance with an IEEE 802.11 standard. In a particular embodiment, the wireless network 350 supports multiple access communication. For example, the wireless network 350 can support communication of a single packet 360 to each of the destination devices 320, 330, and 340, where the single packet 360 includes individual data portions directed to each of the destination devices. In one example, the packet 360 can be an OFDMA packet, as further described herein.

The source device 310 can be an access point (AP) or other device configured to generate and transmit multiple access packet(s) to multiple destination devices. In a particular embodiment, the source device 310 includes a processor 311 (e.g., a central processing unit (CPU), a digital signal processor (DSP), a network processing unit (NPU), etc.), a memory 312 (e.g., a random access memory (RAM), a read-only memory (ROM), etc.), and a wireless interface 315 configured to send and receive data via the wireless network 350. The memory 312 can store binary convolutional code (BCC) interleaving parameters 313 used by an interleaving system 314 to interleave data according to the techniques described with respect to an interleaving system 414 of FIG. 3.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as a two-dimensional structure that spans a frequency range (e.g., tones) and a time period (e.g., symbols).

As an example, a wireless device can receive a packet via an 80 megahertz (MHz) wireless channel (e.g., a channel having 80 MHz bandwidth). The wireless device can perform a 512-point FFT to determine 512 tones in the packet. A subset of the tones can be considered "useable" and the remaining tones can be considered "unusable" (e.g., can be guard tones, direct current (DC) tones, etc.). To illustrate, 496 of the 512 tones can be useable, including 474 data tones and 22 pilot tones. As another example, there can be 476 data tones and 20 pilot tones. It should be noted that the aforementioned channel bandwidths, transforms, and tone plans are just examples. In alternate embodiments, different channel bandwidths (e.g., 5 MHz, 6 MHz, 6.5 MHz, 40 MHz, 80 MHz, etc.), different transforms (e.g., 256-point FFT, 1024-point FFT, etc.), and/or different tone plans can be used.

In a particular embodiment, a packet can include different block sizes (e.g., a different number of data tones per sub-band) that are transmitted over one or more spatial streams. For example, the packet can include 12 data tones per sub-band, 36 data tones per sub-band, 72 data tones per sub-band, 120 data tones per sub-band, 156 data tones per sub-band, or 312 data tones per sub-band. Interleave depths, interleave rotation indices, and base subcarrier rotations combinations can be provided for each block size.

In a particular embodiment, the interleaving parameters 313 can be used by the interleaving system 314 during generation of the multiple access packet 360 to determine which data tones of the packet 360 are assigned to individual destination devices. To illustrate, the packet 360 can utilize interleaved tone allocation. For example, the packet 360 can include distinct sets of tones allocated to each individual destination device 320, 330, and 340. These sets of tones can be referred to as resource unites (RUs). RUs can be the unit of allocation through which APs allocate tones to STAs for the purpose of wireless communication. For example, various RUs can include sets of 26, 52, 106, 242, 484, and/or 996 tones that an AP (for example, the AP 104 of FIG. 1) can allocate, either alone or in combination, to one or more STAs (for example, the STAs 106A-106D of FIG. 1).

The destination devices 320, 330, and 340 can each include a processor (e.g., a processor 321), a memory (e.g., a memory 322), and a wireless interface (e.g., a wireless interface 325). The destination devices 320, 330, and 340 can also each include a deinterleaving system 324 configured to deinterleave packets (e.g., single access packets or multiple access packets), as described with reference to a MIMO detector 418 of FIG. 3. In one example, the memory 322 can store interleaving parameters 323 identical to the interleaving parameters 313.

During operation, the source device 310 can generate and transmit the packet 360 to each of the destination devices 320, 330, and 340 via the wireless network 350. The packet 360 can include distinct sets of data tones that are allocated to each individual destination device according to an interleaved pattern.

The system 300 can thus provide OFDMA data tone interleaving parameters for use by source devices and destination devices to communicate over an IEEE 802.11 wireless network. For example, the interleaving parameters 313, 323 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 310 (e.g., an access point) can receive signal(s) via the wireless network 350. The signal(s) can correspond to an uplink packet. In the packet, distinct sets of tones can be allocated to, and carry uplink data transmitted by, each of the destination devices (e.g., mobile stations) 320, 330, and 340.

Figure 4:
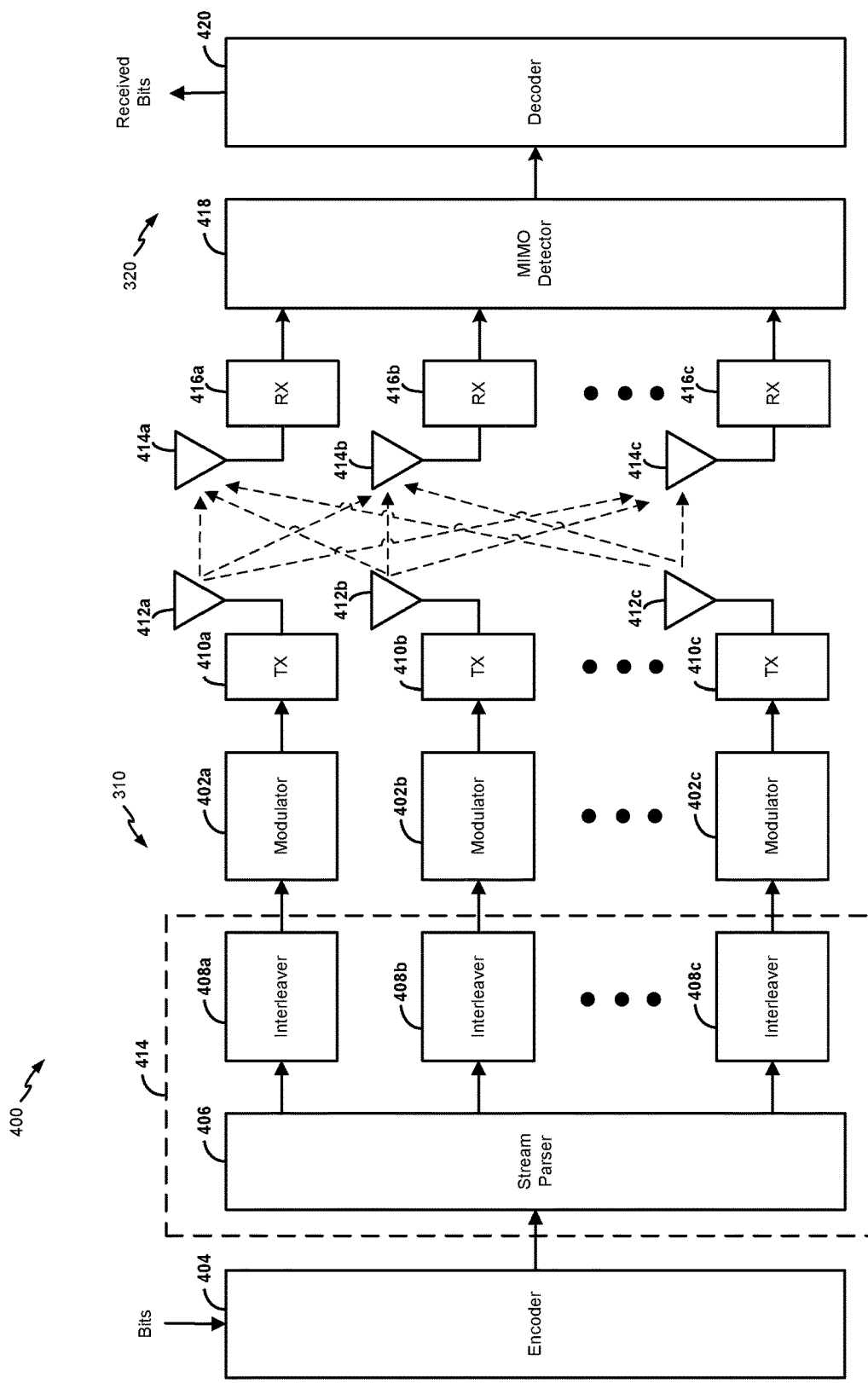
FIG. 4 shows an exemplary multiple-input-multiple-output (MIMO) system that can be implemented in wireless devices, such as the wireless device of FIG. 3, to transmit and receive wireless communications.

FIG. 4 shows an exemplary multiple-input-multiple-output (MIMO) system 400 that can be implemented in wireless devices, such as the wireless device of FIG. 3, to transmit and receive wireless communications. The system 400 includes the first device 310 of FIG. 3 and the destination device 320 of FIG. 3.

The first device 310 includes an encoder 404, the interleaving system 314, a plurality of modulators 402a-402c, a plurality of transmission (TX) circuits 410a-410c, and a plurality of antennas 412a-412c. The destination device 320 includes a plurality of antennas 414a-414c, a plurality of receive (RX) circuits 416a-416c, a MIMO detector 418, and a decoder 420.

A bit sequence can be provided to the encoder 404. The encoder 404 can be configured to encode the bit sequence. For example, the encoder 404 can be configured to apply a forward error correcting (FEC) code to the bit sequence. The FEC code can be a block code, a convolutional code (e.g., a binary convolutional code), etc. The encoded bit sequence can be provided to the interleaving system 314.

The interleaving system 314 can include a stream parser 406 and a plurality of spatial stream interleavers 408a-408c. The stream parser 406 can be configured to parse the encoded bit stream from the encoder 404 to the plurality of spatial stream interleavers 408a-408c.

Each interleaver 408a-408c can be configured to perform frequency interleaving. For example, the stream parser 406 can output blocks of coded bits per symbol for each spatial stream. Each block can be interleaved by a corresponding interleaver 408a-408c that writes to rows and reads out columns. The number of columns (Ncol), or the interleaver depth, can be based on the number of data tones (Nsd). The number of rows (Nrow) can be a function of the number of columns (Ncol) and the number of data tones (Nsd). For example, the number of rows (Nrow) can be equal to the number of data tones (Nsd) divided by the number of columns (Ncol) (e.g., Nrow=Nsd/Ncol). A frequency rotation can be applied to the spatial streams if there is more than one spatial stream. The frequency rotation can be based on a base subcarrier rotation (Nrot) and a rotation index. The base subcarrier rotation (Nrot) and the rotation index can be based on the number of data tones (Ndata) and the number of spatial streams (Nss).

Dual Sub-Carrier Modulation (DCM)

In various embodiments, dual sub-carrier modulation (DCM) can be employed as a modulation scheme. In DCM, the same data is modulated on a pair of sub-carriers. DCM can advantageously be used to provide range extension and robustness to narrow-band interference. In various embodiments, DCM can be used with binary phase-shift keying (BPSK), quadrature phase-shift keying (QPSK), and/or 16-point quadrature amplitude modulation (QAM). In some embodiments, DCM can be optional. In DCM, BCC interleaving or LDPC can be performed on each half-RU. Accordingly, various legacy BCC interleaver or LDPC implementations can be incompatible with DCM. As discussed herein, various new BCC interleaver or LDPC parameters are defined for each of several potential RU sizes.

Figure 5:
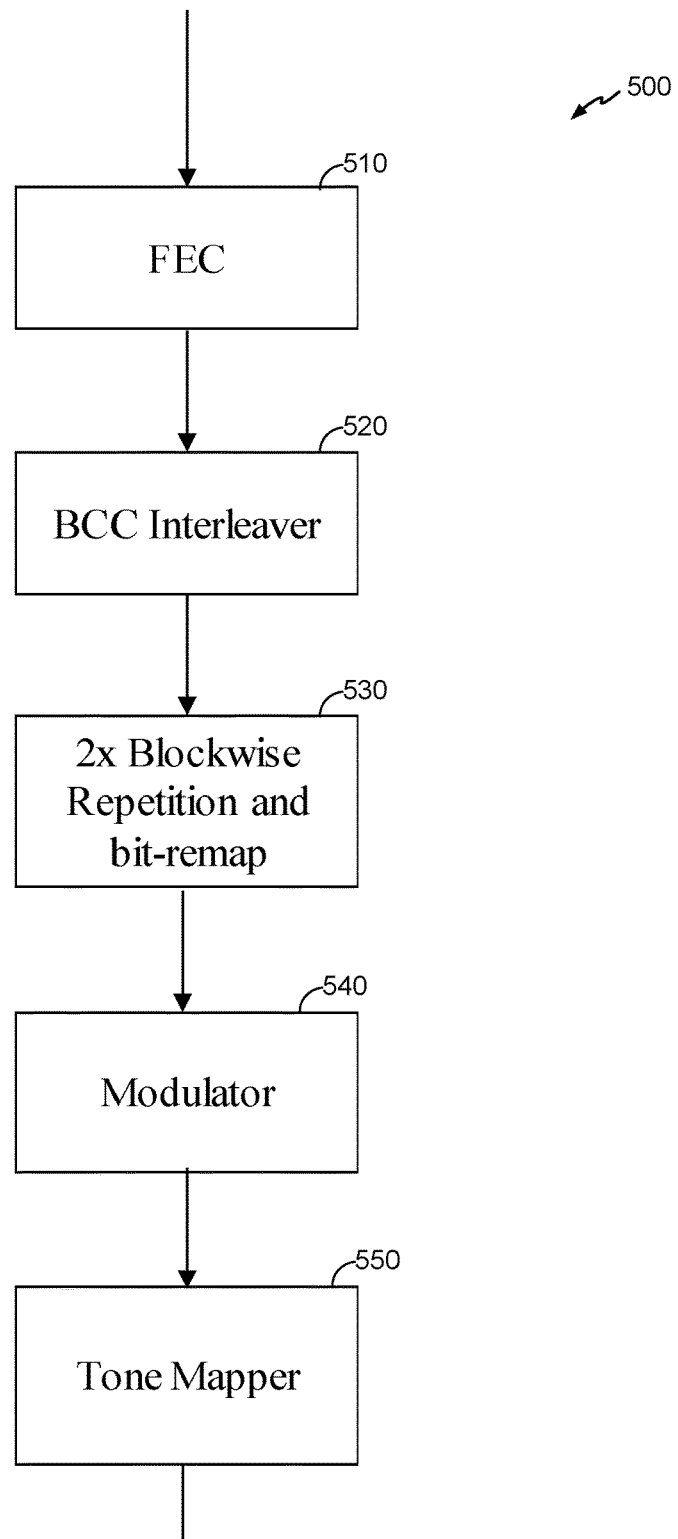
FIG. 5 shows an exemplary transmission system that can be implemented in wireless devices, such as the wireless devices of FIG. 3, to transmit wireless communications.

FIG. 5 shows an exemplary transmission system 500 that can be implemented in wireless devices, such as the wireless devices 310 or 320 of FIG. 3, to transmit wireless communications. The transmission system 500 can implement, for example, the interleaving system 314 of FIG. 3, or the transmitter 210 of FIG. 2. In the illustrated embodiment, the transmission system 500 includes a forward error correction (FEC) unit 510, a BCC interleaver 520, a remapping unit 530, a modulator 540, and a tone mapper 550. In some implementations, one or more features of the forward error correction (FEC) unit 510, the BCC interleaver 520, the remapping unit 530, the modulator 540, and/or the tone mapper 550 may be implemented by a processor (e.g., processor 311 or 321 of FIG. 3) executing instructions stored in memory. Although a number of separate components are illustrated in FIG. 5, those of skill in the art will recognize that one or more of the components can be combined or commonly implemented, components can be rearranged or omitted, or additional components included.

The FEC unit 510 serves to encode a data stream using FEC. Forward error correction or channel coding is a technique used for controlling errors in data transmission over unreliable or noisy communication channels. In various embodiments, the FEC unit 510 can encode the data stream using low-density parity check (LDPC) codes or BCC.

The BCC interleaver 520 serves to interleave the data stream when binary convolutional coding is applied. The BCC interleaver 520 may not be used when LDPC coding is applied instead of BCC coding. In various embodiments, the BCC interleaver 520 can include one or more of the interleavers 408a-408c of FIG. 4. As discussed below with respect to FIGS. 6-7, the number of columns (Ncol), or the interleaver depth, can be based on the number of data tones (Nsd). The number of rows (Nrow) can be a function of the number of columns (Ncol) and the number of data tones (Nsd). For example, the number of rows (Nrow) can be equal to the number of data tones (Nsd) divided by the number of columns (Ncol) (e.g., Nrow=Nsd/Ncol). In various embodiments, a frequency rotation can be applied to the spatial streams if there is more than one spatial stream. The frequency rotation can be based on a base subcarrier rotation (Nrot) and a rotation index. The base subcarrier rotation (Nrot) and the rotation index can be based on the number of data tones (Nsd) and the number of spatial streams (Nss).

The remapping unit 530 serves to perform 2× blockwise repetition and bit remapping. In other words, coded bits are mapped to half-RU tones before repetition. For example, as discussed further with respect to FIGS. 6-7, coded bits are mapped to 12 tones for 26-tone RUs (nominally having 24 data tones), 24 tones for 52-tone RUs (nominally having 48 data tones), 51 tones for 106-tone RUs (nominally having 102 data tones), and so on. Each set of half-RU tones are replicated for modulation over dual channels.

The modulator 540 serves to perform DCM. For example, the modulator 540 modulates each set of half-RU on a pair of sub-carriers (for example, subcarrier K and subcarrier K+N/2). In various embodiments, the modulator can perform BPSK, QPSK, 16-QAM, and so on, for each sub-carrier.

The tone mapper 550 serves to associate constellation points of encoded data bits with OFDM subcarriers. In some implementations, the tone mapper 550 may be used when LDPC coding is applied, and skipped when BCC coding is applied. The OFDM subcarriers to which each tone is mapped can be separated by the indicated number of sub-carriers. For example, such mapping can include encoding a plurality of data bits, and mapping those encoded bits to QAM symbols. Mapping can further include mapping the 1st QAM symbol to the 1st data tone, the 2nd QAM symbol to the (1+DTM)-th data tone, the 3rd QAM symbol to the (1+2*DTM)-th data tone, and so on. Mappings can wrap around such that, for example, the 49th QAM symbol is mapped to the 960-th data tone, and the 50th QAM symbol is mapped to the 2nd data tone, the 51-st QAM symbol is mapped to the (2+D_TM)-th data tone, and so on. In various embodiments, the tone mapper performs LDPC tone mapping in which consecutive symbols are mapped to non-consecutive subcarriers. The tone mapper 550 can perform LDPC tone mapping according to a tone-mapping distance (DTM), the separation distance of the subcarriers. Various DTM parameters are discussed herein with respect to FIGS. 6-7.

FIG. 6 is an illustration of binary convolutional code (BCC) interleaving and low-density parity check (LDPC) tone mapping distances ($D_{TMs}$) for a plurality of resource unit (RU) sizes and corresponding numbers of data tones (Nsd), according to one embodiment. In various embodiments, aspects shown in FIG. 6 can be applied in accordance with other aspects of this disclosure, for example in conjunction with the bandwidths and/or FFT tones discussed with respect to FIG. 4 (or any other figures discussed herein). In this illustration, RU size can be the number of tones that can be allocated as a group to any station. The tones in each allocation can be divided into data tones (Nsd) and pilot tones.

Certain rows in this illustration include multiple embodiments for interleaver parameters or LDPC tone mapping distances. For example, in a single row of the chart shown in FIG. 6, different sub-sets of the parameters may be used for data processing depending on at least (1) whether BCC or LDPC mode is selected, (2) whether DCM mode or non-DCM mode is selected, and (3) whether a single spatial stream or multiple special streams are used. In some aspects, it may be beneficial to perform simulations when choosing between multiple different embodiments for parameters values. In certain aspects, it may be beneficial to choose parameter values which are as close to hardware-compatible values as possible, in order to get similar performance and to ease implementation of these techniques. Generally, for some RU sizes, it may be observed that Ncol multiplied by LDPC tone mapping distance is often equal to the number of data tones.

In various embodiments, LDPC and BCC modes can be mutually exclusive in a single transmission. Accordingly, the wireless device may select either LDPC mode or BCC mode. LDPC parameters are applied when LDPC is used, and BCC parameters are applied when BCC is used. In some embodiments, BCC may be disallowed for four or more spatial streams. Accordingly, in some embodiments, only LDPC is allowed for four or more spatial streams, regardless of whether or not DCM is implemented. Moreover, in some embodiments, BCC Nrot is only applied to 2-4 spatial streams.

In the illustrated embodiment, for an RU size of 26 in non-DCM embodiments, 24 data tones can be used, with an LDPC DTM of 1, BCC Ncol of 8, and BCC Nrot of 2 (for two or more spatial streams). In DCM embodiments, 12 data tones can be used, with an LDPC DTM of 1, BCC Ncol of 4, and BCC Nrot of 1 (for two or more spatial streams).

For an RU size of 52 in non-DCM embodiments, 48 data tones can be used, with an LDPC DTM of 3, BCC Ncol of 16, and BCC Nrot of 11 (for two or more spatial streams). In DCM embodiments, 24 data tones can be used, with an LDPC DTM of 1, BCC Ncol of 8, and BCC Nrot of 6 (for two or more spatial streams).

For an RU size of 106 in non-DCM embodiments, 102 data tones can be used, with an LDPC DTM of 6, BCC Ncol of 17, and BCC Nrot of 29 (for two or more spatial streams). In DCM embodiments, 51 data tones can be used, with an LDPC DTM of 3, BCC Ncol of 17, and BCC Nrot of 13 (for two or more spatial streams).

For an RU size of 242 in non-DCM embodiments, 234 data tones can be used, with an LDPC DTM of 9, BCC Ncol of 26, and BCC Nrot of 58 (for two or more spatial streams). In DCM embodiments, 117 data tones can be used, with an LDPC DTM of 9, BCC Ncol of 13, and BCC Nrot of 28 (for two or more spatial streams).

For an RU size of 484 in non-DCM embodiments, 468 data tones can be used, with an LDPC DTM of 12, BCC Ncol of 39, and BCC Nrot of 116 (for two or more spatial streams). In DCM embodiments, 234 data tones can be used, with an LDPC DTM of 9, BCC Ncol of 26, and BCC Nrot of 58 (for two or more spatial streams).

For an RU size of 996 in non-DCM embodiments, 980 data tones can be used, with an LDPC DTM of 20 and BCC Ncol of 49. In DCM embodiments, 490 data tones can be used, with an LDPC DTM of 214, BCC Ncol of 35, and BCC Nrot of 116 (for two or more spatial streams).

As noted above, for each of these tone size illustrations, not all of the parameters within a single row in the table will be used together for one transmission. As one example, the LDPC-based parameters may not be used with the BCC-based parameters. As another example, the DCM-based parameters may not be used with non-DCM-based parameters.

FIG. 7 is an illustration of binary convolutional code (BCC) interleaving and low-density parity check (LDPC) tone mapping distances ($D_{TMs}$) for a plurality of resource unit (RU) sizes and corresponding numbers of data tones (Nsd), according to another embodiment. In various embodiments, aspects shown in FIG. 7 can be applied in accordance with other aspects of this disclosure, for example in conjunction with the bandwidths and/or FFT tones discussed with respect to FIG. 4 (or any other figures discussed herein). In this illustration, RU size can be the number of tones that can be allocated as a group to any station. The tones in each allocation can be divided into data tones (Nsd), pilot tones, DC tones, guard tones, and leftover tones.

Certain rows in this illustration include multiple embodiments for interleaver parameters or LDPC tone mapping distances. For example, in a single row of the chart shown in FIG. 7, different sub-sets of the parameters may be used for data processing depending on at least (1) whether BCC or LDPC mode is selected, (2) whether DCM mode or non-DCM mode is selected, and (3) whether a single spatial stream or multiple special streams are used. In some aspects, it may be beneficial to perform simulations when choosing between multiple different embodiments for parameters values. In certain aspects, it may be beneficial to choose parameter values which are as close to hardware-compatible values as possible, in order to get similar performance and to ease implementation of these techniques. Generally, for some RU sizes, it may be observed that Ncol multiplied by LDPC tone mapping distance is often equal to the number of data tones.

In various embodiments, LDPC and BCC modes can be mutually exclusive in a single transmission. Accordingly, the wireless device can select one of LDPC and BCC, LDPC parameters can be applied only when LDPC is used, and BCC parameters can be applied only when BCC is used.

In the illustrated embodiment, for an RU size of 26 in non-DCM embodiments, 24 data tones can be used, with an LDPC DTM of 1, BCC Ncol of 8, and BCC Nrot of 2 (for two or more spatial streams). In DCM embodiments, 12 data tones can be used, with an LDPC DTM of 1, BCC Ncol of 4, and BCC Nrot of 1 (for two or more spatial streams).

For an RU size of 52 in non-DCM embodiments, 48 data tones can be used, with an LDPC DTM of 3, BCC Ncol of 16, and BCC Nrot of 11 (for two or more spatial streams). In DCM embodiments, 24 data tones can be used, with an LDPC DTM of 1, BCC Ncol of 8, and BCC Nrot of 6 (for two or more spatial streams).

For an RU size of 106 in non-DCM embodiments, 102 data tones can be used, with an LDPC DTM of 6, BCC Ncol of 17, and BCC Nrot of 29 (for two or more spatial streams). In DCM embodiments, 50 data tones can be used, with an LDPC DTM of 2 or 5, BCC Ncol of 25 or 10, and BCC Nrot of 13 (for two or more spatial streams). In various embodiments, when modulation and coding scheme (MCS) 0 is applied in combination with DCM (for example, with one spatial stream), the number of data bits in a symbol (NDBPS) is equal to (NSD/2)/2. Thus, for the 106-tone RU, NDBPS is 25.5, which is not an integer number. In the illustrated embodiment, one or more data tones are punctured to make NDBPS an integer. Specifically, the half-RU is rounded to 50 tones.

For an RU size of 242 in non-DCM embodiments, 234 data tones can be used, with an LDPC DTM of 9, BCC Ncol of 26, and BCC Nrot of 58 (for two or more spatial streams). In DCM embodiments, 116 data tones can be used, with an LDPC DTM of 4, BCC Ncol of 29, and BCC Nrot of 28 (for two or more spatial streams). In the illustrated embodiment, one or more data tones are punctured to make NDBPS an integer. Specifically, the half-RU is rounded to 116 tones.

For an RU size of 484 in non-DCM embodiments, 468 data tones can be used, with an LDPC DTM of 12, BCC Ncol of 39, and BCC Nrot of 116 (for two or more spatial streams). In DCM embodiments, 234 data tones can be used, with an LDPC DTM of 9, BCC Ncol of 26, and BCC Nrot of 58 (for two or more spatial streams).

For an RU size of 996 in non-DCM embodiments, 980 data tones can be used, with an LDPC DTM of 20 and BCC Ncol of 49. In DCM embodiments, 490 data tones can be used, with an LDPC DTM of 214, BCC Ncol of 35, and BCC Nrot of 116 (for two or more spatial streams).

As noted above, for each of these tone size illustrations, not all of the parameters within a single row in the table will be used together for one transmission. As one example, the LDPC-based parameters may not be used with the BCC-based parameters. As another example, the DCM-based parameters may not be used with non-DCM-based parameters.

FIG. 8 is an illustration of binary convolutional code (BCC) interleaving and low-density parity check (LDPC) tone mapping distances ($D_{TMs}$), according to another embodiment. In the illustrated embodiment, BCC interleaving and LDPC DTMs are shown for a DCM embodiment as applied to 56 usable tones, modulated on each 20 MHz channel. In various embodiments, aspects shown in FIG. 8 can be applied in accordance with other aspects of this disclosure, for example in conjunction with the bandwidths and/or FFT tones discussed with respect to FIG. 4 (or any other figures discussed herein). In this illustration, usable tone size can be the number of tones that can be modulated as a group on each 20 MHz channel. The usable tones can be divided into data tones (Nsd), pilot tones, DC tones, guard tones, and leftover tones.

The 56 usable tone row in this illustration includes multiple embodiments for interleaver parameters and LDPC tone mapping distances. For example, in a single row of the chart shown in FIG. 8, different sub-sets of the parameters may be used for data processing depending on at least (1) whether BCC or LDPC mode is selected, and (2) whether a single spatial stream or multiple special streams are used. In some aspects, it may be beneficial to perform simulations when choosing between multiple different embodiments for parameters values. In certain aspects, it may be beneficial to choose parameter values which are as close to hardware-compatible values as possible, in order to get similar performance and to ease implementation of these techniques. Generally, for some RU sizes, it may be observed that Ncol multiplied by LDPC tone mapping distance is often equal to the number of data tones.

In various embodiments, LDPC and BCC modes can be mutually exclusive in a single transmission. Accordingly, the wireless device can select one of LDPC and BCC, LDPC parameters can be applied only when LDPC is used, and BCC parameters can be applied only when BCC is used.

In the illustrated embodiment, for a usable tone size of 56 in DCM embodiments, 26 data tones can be used, with an LDPC DTM of 1 or 2, BCC Ncol of 13 or 2, and BCC Nrot of 6 (for two or more spatial streams). In various embodiments with two or more spatial streams, rotation indices of [0 2 1 3] can be applied. In some embodiments, only one spatial steam can be allowed for HE-SIG-B transmission.

As noted above, for each of these tone size illustrations, not all of the parameters within a single row in the table will be used together for one transmission. As one example, the LDPC-based parameters may not be used with the BCC-based parameters. As another example, the DCM-based parameters may not be used with non-DCM-based parameters.

Non-Integer $N_{DBPS}$

As discussed above with respect to FIG. 7, $N_{DBPS}$ may be adjusted so as to have an integer value. For example, in DCM embodiments, $N_{DPBS}$ can be equal to $N_{SD}$ times the number of bits per sub carrier ($N_{BPSCS}$). $N_{DBPS}$ can be equal to $N_{CBPS}$ times R. Thus, for 106-tone and 242-tone RUs (with MCSO and DCM), the foregoing equations lead to non-integer $N_{DBPS}$.

To overcome this non-integer issue, in the foregoing embodiment of FIG. 7, one or more data tones can be punctured in order to make $N_{DBPS}$ an integer. In the following embodiment of FIG. 9, on the other hand, $N_{DPBS}$ can be set equal to the floor of: the number of coded bits per symbol ($N_{CBPS}$) times the coding rate (R, which in various embodiments can be 0.5). Moreover, in BCC embodiments, one extra coded bit can be padded after FEC of $N_{DPBS}$, when appropriate, to reach $N_{CBPS}$ for each OFDM symbol. In LDPC embodiments, the encoder can output the selected $N_{CBPS}$ directly and with no padding added.

FIG. 9 is an illustration of binary convolutional code (BCC) interleaving and low-density parity check (LDPC) tone mapping distances ($D_{TMs}$) for a plurality of resource unit (RU) sizes and corresponding numbers of data tones (Nsd), according to one embodiment. In various embodiments, aspects shown in FIG. 9 can be applied in accordance with other aspects of this disclosure, for example in conjunction with the bandwidths and/or FFT tones discussed with respect to FIG. 4 (or any other figures discussed herein). In this illustration, RU size can be the number of tones that can be allocated as a group to any station. The tones in each allocation can be divided into data tones (Nsd) and pilot tones.

Certain rows in this illustration include multiple embodiments for interleaver parameters or LDPC tone mapping distances. For example, in a single row of the chart shown in FIG. 9, different sub-sets of the parameters may be used for data processing depending on at least (1) whether BCC or LDPC mode is selected, and (2) whether DCM mode or non-DCM mode is selected.

In the illustrated embodiment, for an RU size of 26 in non-DCM embodiments, 24 data tones can be used, with an $N_{DBPS}$ of 12, and $N_{CBPS}$ of 24, LDPC DTM of 1, BCC Ncol of 8, and BCC Nrow of 3. In DCM embodiments, 12 data tones can be used, with an $N_{DBPS}$ of 6, and $N_{DBPS}$ of 12, LDPC DTM of 1, BCC Ncol of 4, and BCC Nrow of 3.

For an RU size of 52 in non-DCM embodiments, 48 data tones can be used, with an $N_{DBPS}$ of 24, and $N_{CBPS}$ of 48, LDPC DTM of 3, BCC Ncol of 16, and BCC Nrow of 3. In DCM embodiments, 24 data tones can be used, with an $N_{DBPS}$ of 12, and $N_{CBPS}$ of 24, LDPC DTM of 1, BCC Ncol of 8, and BCC Nrow of 3.

For an RU size of 56 (e.g., HE-SIG-B) in non-DCM embodiments, 52 data tones can be used, with an $N_{DBPS}$ of 26, and $N_{CBPS}$ of 52, BCC Ncol of 13, and BCC Nrow of 2. In DCM embodiments, 26 data tones can be used, with an $N_{DBPS}$ of 13, and $N_{CBPS}$ of 26, BCC Ncol of 13, and BCC Nrow of 2. LDPC modes can be omitted.

For an RU size of 106 in non-DCM embodiments, 102 data tones can be used, with an $N_{DBPS}$ of 51, and $N_{CBPS}$ of 102, LDPC DTM of 6, BCC Ncol of 17, and BCC Nrow of 6. In DCM embodiments, 51 data tones can be used, with an $N_{DBPS}$ of 25, and $N_{CBPS}$ of 50 plus 1 padding bit (for BCC embodiments) or 51 (for LDPC embodiments), LDPC DTM of 3, BCC Ncol of 17, and BCC Nrow of 3. Thus, in contrast to the embodiments of FIG. 7, the non-integer $N_{DBPS}$ of 25.5 is floored to 25.

For an RU size of 242 in non-DCM embodiments, 234 data tones can be used, with an $N_{DBPS}$ of 117, and $N_{CBPS}$ of 234, LDPC DTM of 9, BCC Ncol of 26, and BCC Nrow of 9. In DCM embodiments, 117 data tones can be used, with an $N_{DBPS}$ of 58, and $N_{CBPS}$ of 116 plus 1 padding bit (for BCC embodiments) or 117 (for LDPC embodiments), LDPC DTM of 9, BCC Ncol of 13, and BCC Nrow of 9. Thus, in contrast to the embodiments of FIG. 7, the non-integer $N_{DBPS}$ of 58.5 is floored to 58.

For an RU size of 484 in non-DCM embodiments, 468 data tones can be used, with an $N_{DBPS}$ of 234, and $N_{CBPS}$ of 468, and LDPC DTM of 12. In DCM embodiments, 234 data tones can be used, with an $N_{DBPS}$ of 117, and $N_{CBPS}$ of 234, and LDPC DTM of 9. BCC modes can be omitted.

For an RU size of 996 in non-DCM embodiments, 980 data tones can be used, with an $N_{DBPS}$ of 490, and $N_{CBPS}$ of 980, and LDPC DTM of 20. In DCM embodiments, 490 data tones can be used, with an $N_{DBPS}$ of 245, and $N_{CBPS}$ of 490, and LDPC DTM of 14. BCC modes can be omitted.

As noted above, for each of these tone size illustrations, not all of the parameters within a single row in the table will be used together for one transmission. As one example, the LDPC-based parameters may not be used with the BCC-based parameters. As another example, the DCM-based parameters may not be used with non-DCM-based parameters.

In various embodiments, aspects shown in FIGS. 6-9 can be applied to a signal (SIG) field, such as a high-efficiency signal (HE-SIG) field. In various embodiments, more than one HE-SIG field can be included in a transmission. For example, a transmission can include a first HE-SIG field (HE-SIG-A) and a second HE-SIG field (HE-SIG-B). In various embodiments, aspects shown in FIGS. 6-9 can be applied only to an HE-SIG-B field. In various embodiments, DCM can be an optional mode for HE-SIG-B fields.

DCM Support and Capability Indication

In various embodiments, DCM can be applied (in some embodiments, exclusively) in the following MCS modes: 0, 1, 3, and 4. In various embodiments, DCM can be applied (in some embodiments, exclusively) to configurations having 1 or 2 spatial streams. In various embodiments, DCM can be applied (in some embodiments, exclusively) in combination with space-time block coding (STBC) and/or multi-user MIMO (MU-MIMO).

In various embodiments, devices can signal a maximum constellation capability for use in DCM modes. For example, the DCM maximum constellation indication can include 2 bits, which can indicate the maximum constellation as follows: 0b00 where the device does not support DCM, 0b01 where the device supports up to BPSK in DCM, 0b10 where the device supports up to QPSK (e.g., including BPSK) in DCM, and 0b11 where the device supports up to 16QAM (e.g., including QPSK and BPSK) in DCM.

In various embodiments, devices can signal a maximum number of streams for use in DCM modes. For example, the DCM maximum $N_{SS}$ indication can include 1 bit, which can indicate the maximum number of spatial streams as follows: 0b0 where the device supports 1 stream in DCM, and 0b1 where the device supports up to 2 streams in DCM (e.g., either 1 or 2 streams).

In various embodiments, devices can signal support for STBC for use in DCM modes. For example, the DCM STBC indication can include 1 bit or flag, which can indicate the support for DCM+STBC mode when set to true. Similarly, devices can signal support for MU-MIMO for use in DCM modes. For example, the DCM MU-MIMO indication can include 1 bit or flag, which can indicate the support for DCM+MU-MIMO mode when set to true.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus configured to perform wireless communication, comprising:
    a memory that stores instructions; and
    a processor coupled with the memory and configured to execute the instructions to:
    select a dual sub-carrier modulation (DCM) mode or a non-DCM mode;
    select one or more interleaver parameters based on the selection of the DCM mode or the non-DCM mode, wherein the processor is configured to select a first set of interleaver parameters when the DCM mode is selected and a second set of interleaver parameters, different than the first set of interleaver parameters, when the non-DCM mode is selected;
    apply the one or more interleaver parameters to interleave data of a message, wherein the first set of interleaver parameters is applied to:
        12 data tones for a resource unit (RU) size of 26,
        24 data tones for an RU size of 52,
        51 data tones for an RU size of 106,
        117 data tones for an RU size of 242,
        234 data tones for an RU size of 484, and
        490 data tones for an RU size of 996; and
    provide the message for transmission to a receiving device.

2. The apparatus of claim 1, wherein the processor is configured to apply the second set of interleaver parameters to:
    24 data tones for a resource unit (RU) size of 26;
    48 data tones for an RU size of 52;
    102 data tones for an RU size of 106;
    234 data tones for an RU size of 242;
    468 data tones for an RU size of 484; and
    980 data tones for an RU size of 996.

3. The apparatus of claim 1, wherein the first set of interleaver parameters comprises:
    for a resource unit (RU) size of 26, a low-density parity check (LDPC) tone mapping distances (DTM) of 1;
    for an RU size of 52, an LDPC DTM of 1;
    for an RU size of 106, an LDPC DTM of 3;
    for an RU size of 242, an LDPC DTM of 9;
    for an RU size of 484, an LDPC DTM of 9; and
    for an RU size of 996, an LDPC DTM of 14.

4. The apparatus of claim 1, wherein the first set of interleaver parameters comprises:
    for a resource unit (RU) size of 26, a binary convolutional code (BCC) number of columns (Ncol) of 4;
    for an RU size of 52, BCC Ncol of 8;
    for an RU size of 106, BCC Ncol of 17; and
    for an RU size of 242, BCC Ncol of 13.

5. The apparatus of claim 1, wherein the first set of interleaver parameters comprises:
    for a resource unit (RU) size of 26, a binary convolutional code (BCC) number of columns (Ncol) of 4 and BCC base subcarrier rotation (Nrot) of 1 for two or more spatial streams;
    for an RU size of 52, BCC Ncol of 8 and BCC Nrot of 6 for two or more spatial streams;
    for an RU size of 106, BCC Ncol of 17 and BCC Nrot of 13 for two or more spatial streams; and
    for an RU size of 242, BCC Ncol of 13 and BCC Nrot of 28 for two or more spatial streams.

6. An apparatus configured to perform wireless communication, comprising:
    a memory that stores instructions; and
    a processor coupled with the memory and configured to execute the instructions to:
    select a dual sub-carrier modulation (DCM) mode or a non-DCM mode;
    select one or more interleaver parameters based on the selection of the DCM mode or the non-DCM mode, wherein the processor is configured to select a first set of interleaver parameters when the DCM mode is selected and a second set of interleaver parameters, different than the first set of interleaver parameters, when the non-DCM mode is selected;
    apply the one or more interleaver parameters to interleave data of a message, wherein the first set of interleaver parameters is applied, in a signal field of a preamble of the message, to 26 data tones for a usable tone size of 56; and
    provide the message for transmission to a receiving device.

7. The apparatus of claim 6, wherein the first set of interleaver parameters comprises:
    for a usable tone size of 56, BCC Ncol of 13 or 2.

8. The apparatus of claim 6, wherein the first set of interleaver parameters comprises:
    for a usable tone size of 56, BCC Ncol of 13 or 2 and BCC Nrot of 6 for two or more spatial streams.

9. The apparatus of claim 1, wherein the second set of interleaver parameters comprises:
    for a resource unit (RU) size of 26, a low-density parity check (LDPC) tone mapping distances (DTM) of 1;
    for an RU size of 52, an LDPC DTM of 3;
    for an RU size of 106, an LDPC DTM of 6;
    for an RU size of 242, an LDPC DTM of 9;
    for an RU size of 484, an LDPC DTM of 12; and
    for an RU size of 996, an LDPC DTM of 20.

10. The apparatus of claim 1, wherein the second set of interleaver parameters comprises:
    for a resource unit (RU) size of 26, a binary convolutional code (BCC) number of columns (Ncol) of 8;
    for an RU size of 52, BCC Ncol of 16;
    for an RU size of 106, BCC Ncol of 17; and
    for an RU size of 242, BCC Ncol of 26.

11. The apparatus of claim 1, wherein the second set of interleaver parameters comprises:
    for a resource unit (RU) size of 26, a binary convolutional code (BCC) number of columns (Ncol) of 8, and BCC base subcarrier rotation (Nrot) of 2 for two or more spatial streams;
    for an RU size of 52, BCC Ncol of 16, and BCC Nrot of 11 for two or more spatial streams;
    for an RU size of 106, BCC Ncol of 17, and BCC Nrot of 29 for two or more spatial streams; and for an RU size of 242, BCC Ncol of 26, and BCC Nrot of 58 for two or more spatial streams.

12. The apparatus of claim 1, wherein the apparatus is a mobile station, and wherein the processor is configured to provide the message for transmission by being configured to transmit the message through a transmitter and an antenna of the mobile station to an access point serving the mobile station.

13. The apparatus of claim 1, wherein the apparatus is an access point, and wherein the processor is configured to provide the message for transmission by being configured to transmit the message through a transmitter and an antenna of the access point to a mobile station served by the access point.

14. The apparatus of claim 1, wherein the processor is further configured to set, when selecting DCM mode, a number of data bits in a symbol (NDBPS) to the floor of (a number of coded bits per symbol (NCBPS) times a coding rate (R)).

15. The apparatus of claim 1, wherein the first set of interleaver parameters comprises:
   for a resource unit (RU) size of 26, a binary convolutional code (BCC) number of columns (Ncol) of 4 and number of rows (Nrow) of 3;
   for an RU size of 52, BCC Ncol of 8 and BCC Nrow of 3;
   for an RU size of 56, BCC Ncol of 13 and BCC Nrow of 2;
   for an RU size of 106, BCC Ncol of 17 and BCC Nrow of 3; and
   for an RU size of 242, BCC Ncol of 13 and BCC Nrow of 9.

16. The apparatus of claim 1, wherein the DCM mode is selected exclusively in modulation and coding scheme (MCS) modes: 0, 1, 3, and 4.

17. The apparatus of claim 1, wherein the DCM is selected exclusively for transmission over 1 or 2 spatial streams.

18. The apparatus of claim 1, wherein the processor is further configured to provide an indication of a maximum constellation capability for use in the DCM mode.

19. The apparatus of claim 1, wherein the processor is further configured to provide an indication of a maximum number of streams for use in the DCM mode.

20. The apparatus of claim 1, wherein the processor is further configured to provide an indication of support for space-time block coding (STBC) in combination with the DCM mode.

21. The apparatus of claim 1, wherein the processor is further configured to provide an indication of support for multi-user multiple-input-multiple-output (MU-MIMO) in combination with the DCM mode.

22. A method of wireless communication, comprising:
   selecting a dual sub-carrier modulation (DCM) mode or a non-DCM mode;
   selecting one or more interleaver parameters based on the selection of the DCM mode or the non-DCM mode, by selecting a first set of interleaver parameters when the DCM mode is selected and a second set of interleaver parameters, different than the first set of interleaver parameters, when the non-DCM mode is selected;
   applying the one or more interleaver parameters to interleave data of a message, wherein the first set of interleaver parameters is applied to:
      12 data tones for a resource unit (RU) size of 26,
      24 data tones for an RU size of 52,
      51 data tones for an RU size of 106,
      117 data tones for an RU size of 242,
      234 data tones for an RU size of 484, and
      490 data tones for an RU size of 996; and
   providing the message for transmission to a receiving device.

23. The method of claim 22, wherein the second set of interleaver parameters is applied to:
   24 data tones for a resource unit (RU) size of 26;
   48 data tones for an RU size of 52;
   102 data tones for an RU size of 106;
   234 data tones for an RU size of 242;
   468 data tones for an RU size of 484; and
   980 data tones for an RU size of 996.

24. The method of claim 22, wherein the first set of interleaver parameters comprises:
   for a resource unit (RU) size of 26, a low-density parity check (LDPC) tone mapping distances (DTM) of 1;
   for an RU size of 52, an LDPC DTM of 1;
   for an RU size of 106, an LDPC DTM of 3;
   for an RU size of 242, an LDPC DTM of 9;
   for an RU size of 484, an LDPC DTM of 9; and
   for an RU size of 996, an LDPC DTM of 14.

25. The method of claim 22, wherein the first set of interleaver parameters comprises:
   for a resource unit (RU) size of 26, a binary convolutional code (BCC) number of columns (Ncol) of 4;
   for an RU size of 52, BCC Ncol of 8;
   for an RU size of 106, BCC Ncol of 17: and
   for an RU size of 242, BCC Ncol of 13.

26. The method of claim 22, wherein the second set of interleaver parameters comprises:
   for a resource unit (RU) size of 26, a low-density parity check (LDPC) tone mapping distances (DTM) of 1;
   for an RU size of 52, an LDPC DTM of 3;
   for an RU size of 106, an LDPC DTM of 6;
   for an RU size of 242, an LDPC DTM of 9;
   for an RU size of 484, an LDPC DTM of 12; and
   for an RU size of 996, an LDPC DTM of 20.

27. An apparatus for wireless communication, comprising:
   means for selecting a dual sub-carrier modulation (DCM) mode or a non-DCM mode;
   means for selecting one or more interleaver parameters based on the selection of the DCM mode or the non-DCM mode, by selecting a first set of interleaver parameters when the DCM mode is selected and a second set of interleaver parameters, different than the first set of interleaver parameters, when the non-DCM mode is selected;
   means for applying the one or more interleaver parameters to interleave data of a message, wherein the first set of interleaver parameters is applied to:
      12 data tones for a resource unit (RU) size of 26,
      24 data tones for an RU size of 52,
      51 data tones for an RU size of 106,
      117 data tones for an RU size of 242,
      234 data tones for an RU size of 484, and
      490 data tones for an RU size of 996; and
   means for providing the message for transmission to a receiving device.

28. The apparatus of claim 6, wherein the first set of interleaver parameters comprises:
   for a usable tone size of 56, an LDPC DTM of 1 or 2.

29. The apparatus of claim 6, wherein the first set of interleaver parameters comprises:

for a resource unit (RU) size of 26, a number of data bits in a symbol (NDBPS) of 6 and a number of coded bits per symbol (NCBPS) of 12;
for an RU size of 56, NDBPS of 13 and NCBPS of 26;
for an RU size of 106, NDBPS of 25 and NCBPS of 51 or 50 plus one padding bit;
for an RU size of 242, NDBPS of 58 and NCBPS of 117 or 116 plus one padding bit;
for an RU size of 484, NDBPS of 117 and NCBPS of 234; and
for an RU size of 996, NDBPS of 245 and NCBPS of 490.

30. The apparatus of claim 6, wherein the second set of interleaver parameters comprises:
for a resource unit (RU) size of 26, a number of data bits in a symbol (NDBPS) of 12 and a number of coded bits per symbol (NCBPS) of 24;
for an RU size of 24, NDBPS of 12 and NCBPS of 48;
for an RU size of 56, NDBPS of 26 and NCBPS of 52;
for an RU size of 106, NDBPS of 51and NCBPS of 102;
for an RU size of 242, NDBPS of 117 and NCBPS of 234;
for an RU size of 484, NDBPS of 234 and NCBPS of 468; and
for an RU size of 996, NDBPS of 490 and NCBPS of 980.

* * * * *